(12) United States Patent  (10) Patent No.: US 7,742,161 B2
De Smet  (45) Date of Patent: Jun. 22, 2010

(54) PROCESS AND DEVICE FOR MONITORING THE ILLUMINATION OF LAMP BULBS

(75) Inventor: Marie-Anne De Smet, Monbrun (FR)

(73) Assignee: Airbus France, Toulouse (FR)

( * ) Notice: Subject to any disclaimer, the term of this patent is extended or adjusted under 35 U.S.C. 154(b) by 12 days.

(21) Appl. No.: 11/774,218

(22) Filed: Jul. 6, 2007

(65) Prior Publication Data
US 2008/0030723 A1  Feb. 7, 2008

(30) Foreign Application Priority Data
Jul. 7, 2006 (FR) ................... 06 52864

(51) Int. Cl.
*G01J 1/00* (2006.01)
(52) U.S. Cl. ...................... 356/213; 356/218
(58) Field of Classification Search ................. 356/213, 356/218, 221, 222, 229, 227; 315/155, 149, 315/308
See application file for complete search history.

(56) References Cited

U.S. PATENT DOCUMENTS

| 2,149,285 | A | | 3/1939 | Graham | |
|---|---|---|---|---|---|
| 3,563,651 | A | * | 2/1971 | Alvarez et al. | 356/4.07 |
| 3,996,494 | A | * | 12/1976 | Suga | 315/151 |
| 4,837,450 | A | * | 6/1989 | Satomura et al. | 250/559.02 |
| 5,066,121 | A | * | 11/1991 | Bernhard | 356/218 |
| 5,336,976 | A | * | 8/1994 | Webb et al. | 315/134 |
| 5,422,716 | A | * | 6/1995 | Dempsey | 356/218 |
| 5,446,277 | A | * | 8/1995 | Rutter | 250/214 R |
| 5,495,329 | A | * | 2/1996 | Anderson et al. | 356/218 |
| 5,818,575 | A | * | 10/1998 | Creighton | 356/222 |
| 6,362,573 | B1 | * | 3/2002 | Helbing et al. | 315/155 |
| 6,366,350 | B1 | * | 4/2002 | Thornburg et al. | 356/222 |
| 6,456,373 | B1 | * | 9/2002 | Wienecke et al. | 356/218 |
| 6,692,694 | B1 | * | 2/2004 | Curry et al. | 422/28 |
| 2004/0071445 | A1 | * | 4/2004 | Tarnoff et al. | 386/96 |

FOREIGN PATENT DOCUMENTS

| DE | 3716251 C2 | 7/1990 |
|---|---|---|
| DE | 4137774 A1 | 9/1992 |
| FR | 2670648 A1 | 6/1992 |
| GB | 2345998 A | 7/2000 |

* cited by examiner

*Primary Examiner*—Hoa Q Pham
(74) *Attorney, Agent, or Firm*—Perman & Green LLP

(57) ABSTRACT

A device for measuring the illumination of a light bulb wherein it has a sensor for measuring the illumination of the bulb and a device for measurement and comparison of the value of illumination of the bulb to at least one threshold.

8 Claims, 2 Drawing Sheets

PROCESS AND DEVICE FOR MONITORING THE ILLUMINATION OF LAMP BULBS

The disclosed embodiments concern a process and a device for monitoring the illumination of lamp bulbs, particularly designed for monitoring lamp bulbs for external illumination on aircraft, such as landing beacons, in view of replacing them before they burn out.

The disclosed embodiments notably permit monitoring the aging of landing beacon lamps and carrying out predictive maintenance of such lamps.

The problem posed by aging or burnout of lamps such as aircraft landing beacons, cabin light bulbs or diodes in the cabin for marking evacuation exits from the aircraft, is that the companies using these aircraft are confronted with the fact that the plane is not allowed to take off if one of these lamps is not operational.

The operating time for changing a burned-out lamp is such that the company must compensate the airport operator for the additional time that passes, and that this operating time risks losing the allotted take-off slot and causing cascading delays for the other steps that the aircraft must undergo.

The cost of lost time is out of proportion with the cost of the bulb.

In addition, due to the fact of disparities of bulbs or lamps and their usage conditions, it is not possible to consider a systematic replacement of these bulbs or lamps according to a given schedule.

It has been determined that wear of the bulbs leads to a loss of their luminosity before they burn out.

It has also been observed that an increase or abnormal variation in the illumination of the lamps and bulbs is also an indication of approaching burnout, and notably for premature burnout.

The disclosed embodiments seek to create a system for measuring luminous intensity and detecting anomalies in aircraft bulbs that is not cumbersome, and is reliable and easy to install.

The disclosed embodiments provide, on the one hand, a device for measuring the illumination of a light bulb having a measurement sensor and a device for measuring and comparing the lighting value to a threshold, and notably a minimum lighting threshold or maximally tolerated variation threshold.

The disclosed embodiments provide, on the other hand, a process for tracking the illumination of light bulbs that consists of measuring the illumination of said bulbs in a stabilized phase, comparing the measured value to a limit value, notably a low limit value or a limit value of maximum tolerated variation and triggering an alarm when the illumination value of the bulb goes below this low limit or above this value of maximal tolerated variation, i.e., when the difference between the instantaneous illumination value and its stabilized value goes beyond a specific threshold.

Figure 1:
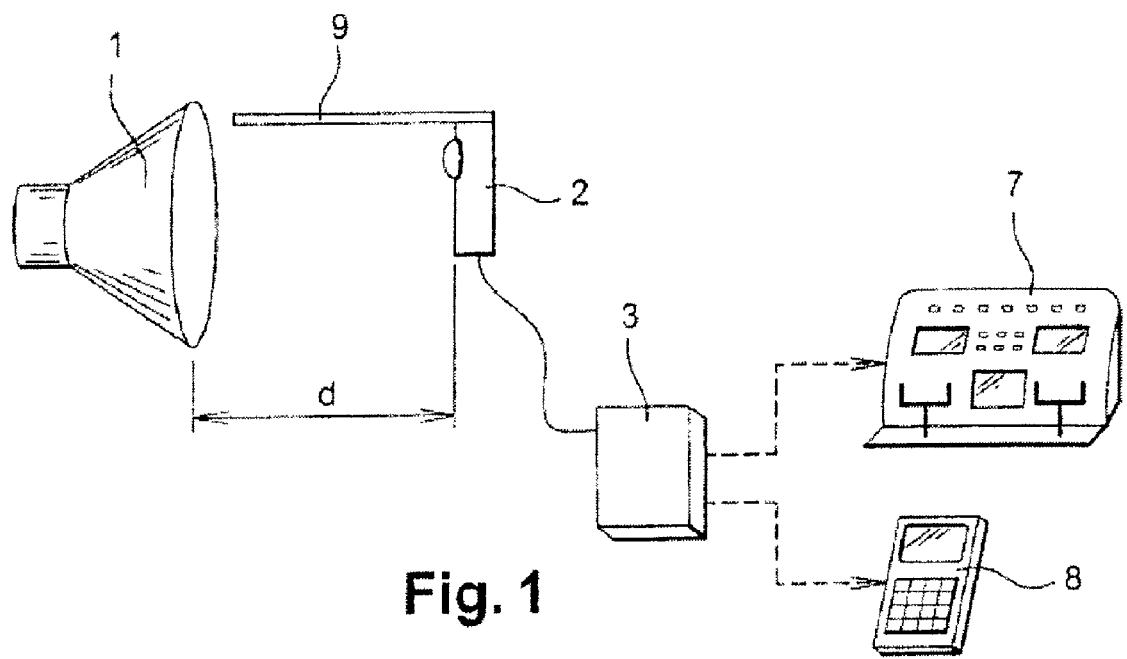
Figure 2:
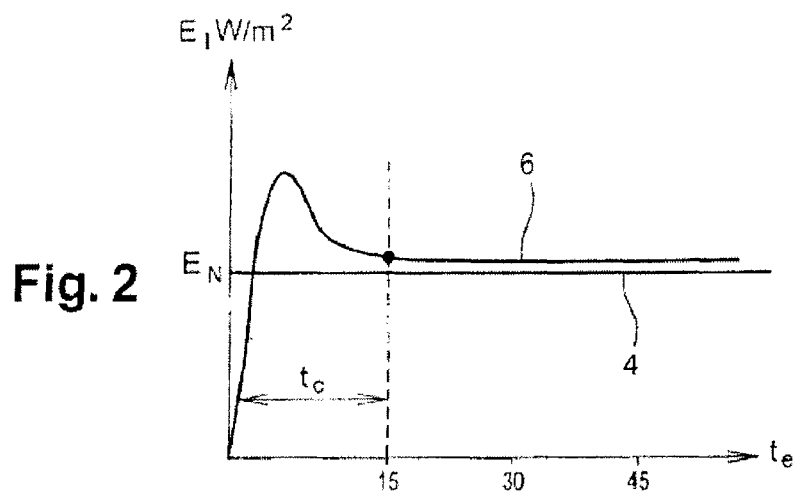

Other characteristics and advantages of the invention will appear upon reading the description that follows of one non-limiting example of embodiment of the invention accompanied by drawings that show:

FIG. 1: one example of embodiment of a device according to one embodiment;

FIG. 2: an illumination curve of a bulb when it is turned on.

Figure 3:
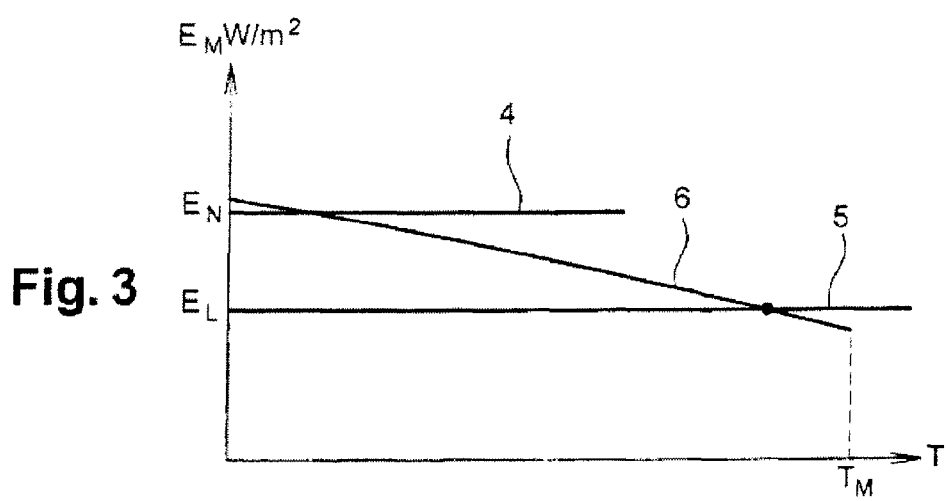
Figure 4:
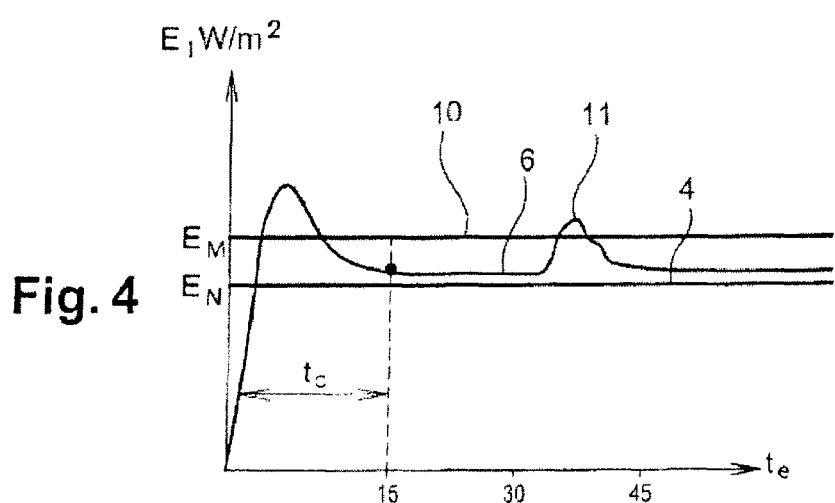

FIG. 3: an average illumination curve of a bulb throughout its service life;

FIG. 4: an illumination curve of a lamp with an anomaly before burning out.

FIG. 1 schematically shows a device for measuring the illumination 6 of a light bulb 1 according to the invention.

This device is described below within the scope of an aeronautic application for monitoring bulbs of aircraft landing beacons, but can, while remaining within the scope of the disclosed embodiments, be used in fields other than the aeronautic field.

This device has a sensor 2 for measuring the illumination of the bulb.

Preferably, measurement sensor 2 is locked onto a specific wavelength representative of the behavior of the bulb over time.

This wavelength, in particular, can be the predominant illumination wavelength of the bulb according to the color temperature of the bulb.

One example of a landing beacon lamp is the lamp referenced Q4559X manufactured by the General Electric company, of the PAR type (aluminized parabolic deflector lamp), a 600 W lamp with 28 volts diffusing a light of 765,000 candles with a color temperature of 3200 K.

In order to obtain the best measurement sensitivity for determining the wear of a bulb, a wavelength for the illumination peak of the bulb as a function of the color temperature of the bulb will be used.

The measurement sensor is advantageously provided with a filter that only allows passage of a wavelength band centered on the measured wavelength.

The device according to one embodiment also comprises a device 3 for measurement and comparison of the value of illumination 6 of the bulb to at least one set threshold 4, 5.

The threshold or thresholds can be set, for example, according to criteria specific to the lamps to be supervised, or at a relative value with regard to an average illumination of these lamps, or any other criterion.

A first application of the device according to the invention is thus to permit measuring the illumination of new bulbs upon receipt of ordered lots and accepting bulbs whose illumination energy is above the fixed threshold, and to analyze the emission behavior of the bulb over a representative period tp to detect any anomaly prior to delivery.

In order for the measurement to be reproducible, sensor 2 is positioned at a fixed distance "d" from bulb 1 and is positioned at this distance by means of a gauge 9.

A second application is the measurement of the aging of the bulbs in view of preventative replacement of bulbs before the end of their life, to prevent aircraft from being immobilized in airports during their use due to burnout of bulbs that have surpassed their normal service life.

In such a case, sensor 2 and measurement device 3 make up part of a portable measurement device moved by an operator touring the airplane and measuring the illumination of all critical lamps to authorize take-off of this airplane.

Alternatively, the sensor and the measurement devices are connected to a monitoring unit 8 of an operator on the ground, this unit collecting the data from several measurement and monitoring devices of the aircraft.

A third application is conducting an automatic measurement without an operator. In this case, sensor 2 is preferably integrated in bulb 1. In this case, it is advantageously connected to systems 7 on board the aircraft and the information according to which one or more bulbs are to be changed is found on its on-board panel.

The sensor can have an electronics system for converting signals, transforming it into a peripheral on a computerized network for collecting the operating parameters of the aircraft.

The process for tracking the illumination 6 of light bulbs 1 of the invention consists of measuring the illumination of said bulbs in a stabilized phase so that the measurement is not disturbed by the illumination peak of the start-up phase of the bulbs.

According to the process of the invention, the illumination of the bulbs is thus measured after a warm-up and stabilization time "tc" of said bulbs of the order of 15 minutes.

In the case of measurement by an operator, the operator will await the stabilization of the bulb illumination before conducting his measurement.

In the case of an automatic measurement and a continuous measurement, the device includes a delay time from the detection of start up of the bulbs in order to begin the measurement only after the warm-up time "tc" defined above.

Automatic measurement also has the advantage of being able to detect illumination surges representing a risk of premature burnout of the bulbs.

Once stabilized operation has been reached, the process consists of comparing the measured value with a limit value 4, to measure the nominal illumination value of the bulb, and to a low limit 5 for measuring the end of the service life of the bulb and to trigger an alarm when the illumination value of the bulb passes below the defined limit value for the bulb.

Thus, according to the process of the disclosed embodiments, a low limit value "$E_l$" for illumination is defined, characteristic of the aging of said bulbs, and a limit for the variation of the illumination value and its stabilized value, and an operator, either the pilot or a maintenance or runway operator, is informed of the crossing of this low limit by illumination 6 of the bulbs to trigger a changing of these bulbs.

The variation limit va permits detecting an abnormal punctiform variation of the luminosity of the bulb during the stabilized period.

Such an abnormal variation is shown in FIG. 4 for which the luminous intensity of a bulb or a lamp has a peak 11 permitting the presumption of an approaching burnout.

If the difference between the illumination value 6 and the stabilized illumination 4 is greater than a threshold $E_M$ 10 (for example, a threshold of 10% of the stabilized value), the performance of the bulb will rapidly degrade and a premature burnout of the bulb is risked before the threshold defined for aging of the bulb.

The measurement of illumination comprises in this case a comparison of the measured value to an average stabilized value $E_N$ and the triggering of an alarm when the illumination value $E_M$ passes above a threshold 10 defined relative to this average stabilized value.

This measurement is preferably a continuous measurement of the illumination of bulbs and lamps in order to detect fleeting variations of illumination of these lamps and bulbs. The invention is not limited to the example described and is applied to all types of lamps from the moment when the cost of immobilization for changing the lamps becomes the predominant factor when compared to the cost of the lamps and of the device according to the invention, or when safety requirements are very important.

The invention claimed is:

1. A device for measuring the illumination of an aircraft landing beacon light bulb, said device having a sensor for measuring the illumination of the bulb and a measurement and comparison device for measuring and comparing the value of illumination of the bulb to at least one threshold, wherein the measurement sensor is locked onto a specific wavelength representative of the behavior of the bulb over time, said wavelength being the predominant illumination wavelength of the bulb according to the color temperature of the bulb, wherein the device comprises means for determining a stabilization time of said bulb in order to begin the measurement after the warm-up time of said bulb, wherein the measurement and comparison device is configured to measure the illumination of the bulb by comparing the measured value to an average stabilized value ($E_N$), wherein the at least one threshold is defined relative to the average stabilized value, and wherein the device includes an alarm that is triggered when the illumination value of the bulb passes above the at least one threshold.

2. The device according to claim 1 wherein said sensor is positioned at a fixed distance from said bulb.

3. The device according to claim 1 wherein said sensor is integrated in said bulb.

4. The device according to claim 1 wherein said measurement device is connected to onboard systems of an aircraft.

5. The device according to claim 1 wherein said sensor and said measurement device are connected to a monitoring unit of a ground operator.

6. The device according to claim 1 wherein said sensor and said measurement device make up part of a portable measurement device.

7. A process for tracking the illumination of aircraft landing beacon light bulbs comprising:

measuring the illumination of said bulbs in a stabilized phase at a predominant wavelength of the bulb;

comparing the measured value to a limit value;

triggering an alarm when the illumination value of the bulb passes the limit value; and measuring the illumination of the bulbs after a warm-up and stabilization time of said bulbs, wherein measuring the illumination of said bulbs comprises comparing the measured value to an average stabilized value ($E_N$), and wherein the limit value is defined relative to the average stabilized value.

8. The process for tracking the illumination of aircraft landing beacon light bulbs according to claim 7, further comprising comparing the measured value to a value for an illumination ($E_l$) characteristic of the aging of said bulbs and further comprising triggering the alarm when the illumination of the bulbs passes below the value for the illumination ($E_l$) characteristic to initiate changing the bulbs.

* * * * *